US011869039B1

(12) United States Patent
Riding

(10) Patent No.: US 11,869,039 B1
(45) Date of Patent: Jan. 9, 2024

(54) DETECTING GESTURES ASSOCIATED WITH CONTENT DISPLAYED IN A PHYSICAL ENVIRONMENT

(71) Applicant: WIDEORBIT LLC, San Francisco, CA (US)

(72) Inventor: Christopher M. Riding, Santa Clarita, CA (US)

(73) Assignee: WideOrbit LLC, San Francisco, CA (US)

( * ) Notice: Subject to any disclaimer, the term of this patent is extended or adjusted under 35 U.S.C. 154(b) by 654 days.

(21) Appl. No.: 15/811,047

(22) Filed: Nov. 13, 2017

(51) Int. Cl.
*G06Q 30/02* (2023.01)
*G06Q 30/0251* (2023.01)
*G06F 3/01* (2006.01)
*G06V 40/16* (2022.01)

(52) U.S. Cl.
CPC ......... *G06Q 30/0269* (2013.01); *G06F 3/012* (2013.01); *G06F 3/017* (2013.01); *G06V 40/172* (2022.01); *G06V 40/174* (2022.01)

(58) Field of Classification Search
CPC ................. G06Q 30/0269; G06K 9/00288; G06F 3/012; G06F 3/017
USPC ...................................................... 705/14.66
See application file for complete search history.

(56) References Cited

U.S. PATENT DOCUMENTS

| | | | |
|---|---|---|---|
| 5,926,605 A | 7/1999 | Ichimura | |
| 7,690,013 B1 | 3/2010 | Eldering et al. | |
| 7,921,036 B1 * | 4/2011 | Sharma | G06Q 20/3674 705/14.49 |
| 8,731,610 B2 | 5/2014 | Appaji | |
| 8,806,530 B1 | 8/2014 | Izdepski et al. | |
| 9,189,287 B1 | 11/2015 | Elder | |
| 9,571,606 B2 | 2/2017 | Winograd | |
| 9,614,734 B1 | 4/2017 | Lazarescu et al. | |
| 10,341,723 B2 | 7/2019 | Benedetto | |
| 10,853,220 B2 | 12/2020 | Doggett et al. | |
| 2002/0072952 A1 | 6/2002 | Hamzy et al. | |
| 2002/0100046 A1 | 7/2002 | Dudkiewicz | |
| 2004/0186719 A1 | 9/2004 | Polanyi et al. | |
| 2005/0281410 A1 | 12/2005 | Grosvenor et al. | |
| 2007/0071206 A1 | 3/2007 | Gainsboro et al. | |
| 2008/0091512 A1 * | 4/2008 | Marci | A61B 5/16 705/7.29 |
| 2008/0306849 A1 | 12/2008 | Johnson et al. | |

(Continued)

FOREIGN PATENT DOCUMENTS

EP 2972972 B1 12/2019
WO 2014/158895 A2 10/2014

OTHER PUBLICATIONS

Ortiz, Amy, Boston Globe, For local Patriots fans, a seesaw of emotions, dated Jan. 24, 2016, downloaded from https://www.bostonglobe.com/metro/2016/01/24/for-local-pats-fans-seesaw-emotions/sGSfZhrkVkXGxniK9XmORL/story.html (Year: 2016).*

(Continued)

*Primary Examiner* — Scott D Gartland
(74) *Attorney, Agent, or Firm* — SEED INTELLECTUAL PROPERTY LAW GROUP LLP

(57) ABSTRACT

Techniques for identifying content displayed by a content presentation system associated with a physical environment, detecting a gesture of a user located within the physical environment, and storing information associated with the gesture in relation to the displayed content are disclosed.

26 Claims, 5 Drawing Sheets

(56) References Cited

U.S. PATENT DOCUMENTS

| | | | |
|---|---|---|---|
| 2008/0319763 A1 | 12/2008 | Di et al. | |
| 2009/0132355 A1* | 5/2009 | Begeja | G06Q 30/0258 |
| | | | 705/14.5 |
| 2009/0299820 A1 | 12/2009 | Wang et al. | |
| 2010/0060722 A1* | 3/2010 | Bell | G06F 3/017 |
| | | | 348/51 |
| 2010/0063880 A1 | 3/2010 | Atsmon et al. | |
| 2010/0070992 A1* | 3/2010 | Morris | H04N 7/17336 |
| | | | 725/32 |
| 2010/0177938 A1* | 7/2010 | Martinez | G06K 9/00677 |
| | | | 382/118 |
| 2010/0269127 A1 | 10/2010 | Krug | |
| 2010/0287475 A1 | 11/2010 | Van et al. | |
| 2011/0201971 A1 | 8/2011 | Kimura et al. | |
| 2011/0247036 A1 | 10/2011 | Adimatyam et al. | |
| 2011/0263946 A1* | 10/2011 | el Kaliouby | A61B 5/1128 |
| | | | 600/300 |
| 2012/0032894 A1 | 2/2012 | Parivar et al. | |
| 2012/0124604 A1 | 5/2012 | Small et al. | |
| 2012/0259722 A1 | 10/2012 | Mikurak | |
| 2013/0036434 A1 | 2/2013 | Shkedi et al. | |
| 2013/0077820 A1* | 3/2013 | Marais | G06K 9/6257 |
| | | | 382/103 |
| 2013/0110900 A1 | 5/2013 | Des et al. | |
| 2013/0144940 A1 | 6/2013 | Law | |
| 2013/0157563 A1 | 6/2013 | Jain et al. | |
| 2013/0167167 A1 | 6/2013 | Steyer et al. | |
| 2013/0218663 A1* | 8/2013 | el Kaliouby | G06Q 30/0242 |
| | | | 705/14.41 |
| 2014/0006158 A1 | 1/2014 | Cooper | |
| 2014/0082654 A1 | 3/2014 | Van et al. | |
| 2014/0084165 A1* | 3/2014 | Fadell | G08B 17/00 |
| | | | 250/340 |
| 2014/0270683 A1 | 9/2014 | Zhu et al. | |
| 2014/0280879 A1 | 9/2014 | Skolicki | |
| 2014/0282280 A1* | 9/2014 | Pack | G06F 1/1694 |
| | | | 715/863 |
| 2014/0359647 A1 | 12/2014 | Shoemake et al. | |
| 2014/0365209 A1 | 12/2014 | Evermann | |
| 2014/0376785 A1 | 12/2014 | Bathiche et al. | |
| 2015/0073916 A1 | 3/2015 | Bhamidipati et al. | |
| 2015/0112796 A1 | 4/2015 | Greenzeiger et al. | |
| 2015/0161649 A1 | 6/2015 | Eggleston et al. | |
| 2015/0177842 A1* | 6/2015 | Rudenko | G06F 21/32 |
| | | | 345/156 |
| 2015/0213435 A1 | 7/2015 | Douglas et al. | |
| 2015/0242679 A1 | 8/2015 | Naveh | |
| 2015/0245103 A1* | 8/2015 | Conte | H04N 21/47815 |
| | | | 725/60 |
| 2015/0287410 A1 | 10/2015 | Mengibar et al. | |
| 2015/0331655 A1 | 11/2015 | Candelore | |
| 2015/0379989 A1 | 12/2015 | Balasubramanian et al. | |
| 2016/0019915 A1 | 1/2016 | Khan et al. | |
| 2016/0037213 A1 | 2/2016 | Collins et al. | |
| 2016/0063989 A1 | 3/2016 | Deleeuw | |
| 2016/0092932 A1 | 3/2016 | Bharath et al. | |
| 2016/0275566 A1 | 9/2016 | Sparrow et al. | |
| 2016/0314498 A1 | 10/2016 | Srivastava et al. | |
| 2016/0335366 A1 | 11/2016 | Zhang et al. | |
| 2016/0335677 A1 | 11/2016 | Aleksic et al. | |
| 2017/0134803 A1 | 5/2017 | Shaw et al. | |
| 2017/0249438 A1 | 8/2017 | Jain et al. | |
| 2017/0262445 A1 | 9/2017 | Jeon et al. | |
| 2017/0315608 A1* | 11/2017 | Shanware | G06F 3/0346 |
| 2017/0316780 A1 | 11/2017 | Lovitt | |
| 2017/0323328 A1 | 11/2017 | Nam | |
| 2017/0330237 A1 | 11/2017 | Canceri et al. | |
| 2017/0364484 A1 | 12/2017 | Hayes | |
| 2017/0371496 A1 | 12/2017 | Denque et al. | |
| 2018/0018933 A1 | 1/2018 | Rehmeyer et al. | |
| 2018/0040019 A1 | 2/2018 | Gavlovski et al. | |
| 2018/0040323 A1 | 2/2018 | Lesso et al. | |
| 2018/0060376 A1 | 3/2018 | Mao et al. | |
| 2018/0063066 A1 | 3/2018 | Kumar et al. | |
| 2018/0069914 A1 | 3/2018 | Abebe et al. | |
| 2018/0136794 A1 | 5/2018 | Cassidy et al. | |
| 2018/0189837 A1 | 7/2018 | Panchaksharaiah et al. | |
| 2018/0253753 A1 | 9/2018 | Chung et al. | |
| 2018/0276712 A1 | 9/2018 | Lewis et al. | |
| 2018/0285748 A1 | 10/2018 | Husain et al. | |
| 2018/0285984 A1 | 10/2018 | Ayachitula et al. | |
| 2018/0315094 A1 | 11/2018 | Ashoori et al. | |
| 2018/0329672 A1 | 11/2018 | Sadak et al. | |
| 2019/0028413 A1 | 1/2019 | Lewis et al. | |
| 2019/0043095 A1 | 2/2019 | Grimaud et al. | |
| 2019/0104201 A1 | 4/2019 | Bati et al. | |
| 2019/0122185 A1 | 4/2019 | Koeppel | |
| 2019/0130917 A1 | 5/2019 | Pogorelik et al. | |
| 2019/0130919 A1 | 5/2019 | Lesso | |
| 2019/0149857 A1 | 5/2019 | Lo et al. | |
| 2019/0205928 A1 | 7/2019 | Lee et al. | |
| 2019/0278817 A1 | 9/2019 | Gross et al. | |
| 2019/0363962 A1 | 11/2019 | Cimino et al. | |
| 2020/0082442 A1 | 3/2020 | Sotomayor | |
| 2020/0152206 A1 | 5/2020 | Shen et al. | |
| 2020/0168222 A1 | 5/2020 | Saito et al. | |

OTHER PUBLICATIONS

Pease, Allan and Barbara, The Definitive Book of Body Language, published by the New York Times on Sep. 24, 2006, downloaded Jan. 20, 2020 from https://www.nytimes.com/2006/09/24/books/chapters/0924-1st-peas.html (Year: 2006).*

Doerrfeld, Bill, 20+ Emotion Recognition APIs That Will Leave You Impressed, and Concerned, dated May 29, 2016 and downloaded Jan. 15, 2020 from https://web.archive.org/web/20160529042447/http://nordicapis.com/20-emotion-recognition-apis-that-will-leave-you-impressed-and-concerned/ - with header (Year: 2016).*

Doerrfeld, Bill, 20+ Emotion Recognition APIs That Will Leave You Impressed, and Concerned, dated May 29, 2016 and downloaded Jan. 15, 2020 from https://web.archive.org/web/20160529042447/http://nordicapis.com/20-emotion-recognition-apis-that-will-leave-you-impressed-and-concerned/ - without header (Year: 2016).*

Calder, Bobby J., Edward C. Malthouse, and Ute Schasdsl. "An experimental study of tho relationship between online engagement and advertising effectiveness." Journal of interactive marketing 23.4 (2009): 321-331. (Year: 2009).

* cited by examiner

DETECTING GESTURES ASSOCIATED WITH CONTENT DISPLAYED IN A PHYSICAL ENVIRONMENT

TECHNICAL FIELD

The present disclosure relates to detecting gestures of a user. In particular, the present disclosure relates to detecting gestures associated with content displayed in a physical environment.

BACKGROUND

Computer processing of video images can be used to recognize when there are one or more people within an image frame. Facial recognition can be used to uniquely identify one or more people within an image frame so that the people can be recognized in other image frames analyzed in the future.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
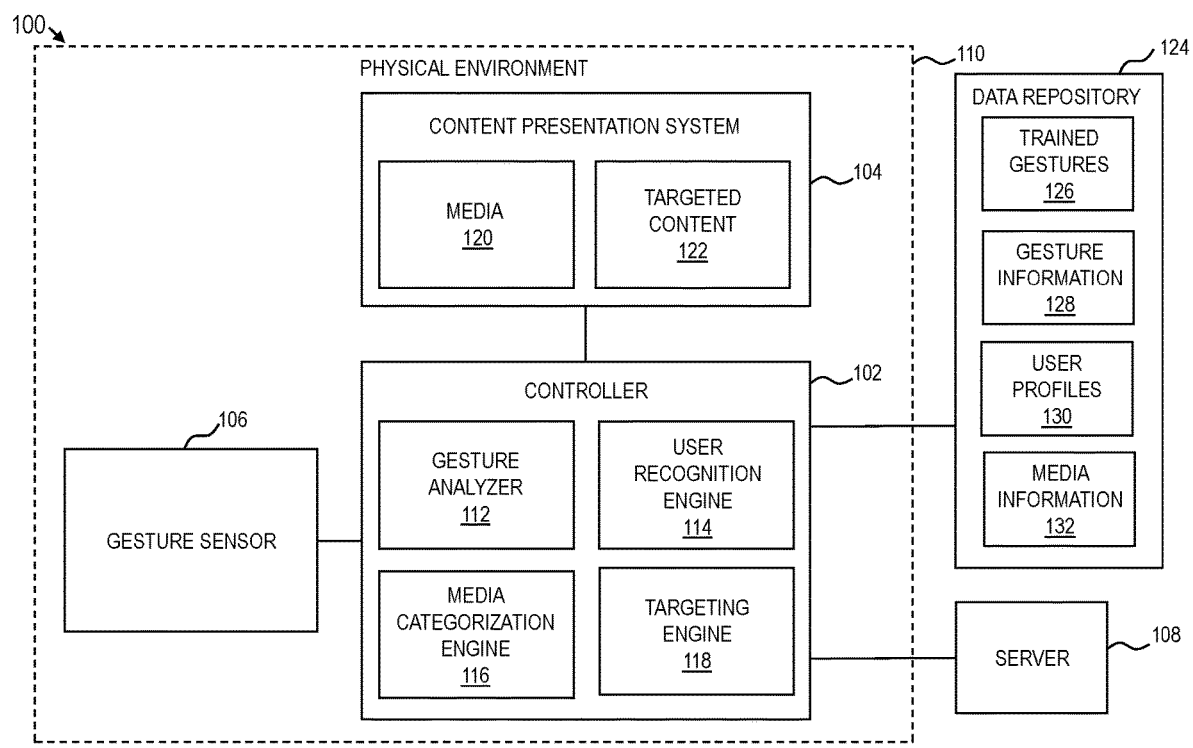
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

In various embodiments, a moving image of a user that is watching a television program or movie may be analyzed by a computer system to detect a gesture made by the user in response to the television program or movie. The detected gesture may be analyzed to determine various types of information regarding the gesture in relation to the content of the television program or movie. For example, an emotional state, sentiment, or reaction to the content may be stored in relation to the content. The reaction may be time-synchronized with the content, so that a user's reaction may be correlated with a particular scene in the content. The information regarding the gesture may indicate a scene or a characteristic of the scene that makes the user excited or happy, for example.

One or more embodiments include identifying content displayed by a content presentation system associated with a physical environment, detecting a gesture of a user located within the physical environment, and storing information associated with the gesture in relation to the displayed content. The content presentation system may include a television or video screen that provides visual presentations or entertainment to one or more people. The gesture of the user may be detected by using an image of the user generated by a video camera contemporaneously with the user viewing the content displayed by the content presentation system. The gesture may include a hand motion, an arm motion such as raising one or both arms, placing hands on the user's hips, folding the user's arms, crossing the user's legs, clapping, eating, drinking, a facial expression such as a smile or frown, an opening of the mouth, a head motion such as a nod or shake of the head, or other motions of any portion of a user's body. The information associated with the gesture may include a user sentiment or emotion mapped to the gesture. The information may be stored by a computer system that receives the image from the video camera.

One or more embodiments also include selecting targeted content based on the information associated with the gesture, and transmitting the targeted content to the content presentation system. The targeted content may include an advertisement or an audio/visual program such as a television show or movie. Transmitting the targeted content may include controlling the content presentation system to present or display the targeted content.

One or more embodiments may also include performing facial recognition to identify the user, and storing information associated with the gesture in relation to the displayed content that is also associated with the identified user. A sentiment may be computed based on the detected gesture, and the sentiment may be stored in association with the identified user.

One or more embodiments may also include detecting a plurality of gestures of the user at a plurality of points in time, and storing a time-indexed stream of information associated with the plurality of gestures in relation to points in time of the displayed content.

One or more embodiments include identifying content displayed by a content presentation system associated with a physical environment, detecting a plurality of expressions of a respective plurality of users located within the physical environment, computing a group sentiment based on the plurality of expressions, and storing the group sentiment in relation to the displayed content. The plurality of expressions may include a plurality of motions of body parts of the respective plurality of users. The plurality of expressions may include a plurality of smiles. The group sentiment may be determined to be happiness when a majority of the plurality of users is determined to have a smile as an expression. One or more embodiments may also include selecting targeted content based on the group sentiment One or more embodiments may also include performing facial recognition to identify each of the plurality of users, computing an individual sentiment associated with each of the plurality of users based on the detected expression of the respective user, and storing the individual sentiment associated with each of the plurality of users in relation to the displayed content.

One or more embodiments may also include detecting a plurality of expressions of each of the respective plurality of users at a plurality of points in time, computing a plurality of time-indexed group sentiments based on the plurality of expressions of each of the respective plurality of users at each of the plurality of points in time, and storing the plurality of time-indexed group sentiments in relation to points in time of the displayed content.

One or more embodiments described in this Specification and/or recited in the claims may not be included in this General Overview section.

2. Architectural Overview

FIG. 1 illustrates a system 100, in accordance with one or more embodiments. As illustrated in FIG. 1, the system 100 includes a controller 102, a content presentation system 104, a gesture sensor 106, a server 108, and a data repository 124. In various embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or digital devices. Multiple components may be combined into one application and/or digital device. Operations described with respect to one component may instead be performed by another component.

The term "digital device" generally refers to any hardware device that includes a processor. A digital device may refer to a physical device executing an application or a virtual machine. Examples of digital devices include a computer, a tablet, a laptop, a desktop, a netbook, a server, a mainframe, a hardware router, a hardware switch, a hardware firewall, a hardware network address translator (NAT), a hardware load balancer, a television, a monitor, a content receiver, a set-top box, a video gaming console, a printer, a cellular phone, a mobile handset, a smartphone, a personal digital assistant ("PDA"), a wireless receiver and/or transmitter, a base station, a communication management device, a controller, an access point, a client device, a streaming stick, a Bluetooth enabled device, a Bluetooth Low Energy (BLE) transmitter, and/or a controller. Two or more components within the system 100 may be communicatively coupled via a local area network, a wide area network, the Internet, an intranet, a cellular network, and/or combinations thereof. A digital device may also be referred to as a "machine".

In one or more embodiments, a system for detecting gestures associated with content displayed in a physical environment refers to hardware and/or software configured to perform operations described herein for a system for detecting gestures associated with content displayed in a physical environment. Examples of operations for a system for detecting gestures associated with content displayed in a physical environment are described below with reference to FIG. 2. Additional embodiments and/or examples relating to computer networks are described below in Section 5, titled "Computer Networks and Cloud Networks."

In one or more embodiments, an interface includes hardware and/or software configured to facilitate communications between a user in the physical environment 110 and the controller 102. The interface may render user interface elements via the content presentation system 104 and receive input via the gesture sensor 106 or other input hardware such as a keyboard, a mouse, a touchpad, etc. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

Some components of the system 100 may be within a same physical environment 110 while other components may be outside of the physical environment 110. In the example of system 100 as illustrated in FIG. 1, the controller 102, the content presentation system 104, and the gesture sensor 106 are included within the physical environment 110. In various embodiments, portions of the controller 102 may be located within the physical environment 110 while other portions of the controller 102 are not located within the physical environment 110, or controller 102 may be fully located outside the physical environment 110. The physical environment 110 may include any physical space where the content presentation system 104 may be located. Examples of the physical environment 110 include, but are not limited to, a room in a home, a classroom, an office, a hallway, a movie theater, an event venue, a bar, etc.

In an embodiment, the data repository 124 is any type of storage unit and/or device (e.g., a file system, database, collection of tables, or any other storage mechanism) for storing data. Further, the data repository 124 may include multiple different storage units and/or devices, local or remote to the controller 102. The data repository 124 may include a hard disk drive (HDD), solid state drive (SSD), thumb drive, dynamic random access memory (DRAM), static random access memory (SRAM), or other data storage system. The multiple different storage units and/or devices may or may not be of the same type or located at the same physical site. Further, the data repository 124 may be implemented or may execute on the same computing system as the controller 102 or the server 108. Alternatively or additionally, the data repository 124 may be implemented or executed on a computing system separate from the controller 102 or the server 108. The data repository 124 may be communicatively coupled to the controller 102 via a direct connection or via a network. Storage of information described as being stored within the data repository 124 may be implemented across any components within the system 100. However, this information is illustrated within the data repository 124 in FIG. 1 for purposes of clarity and explanation.

In an embodiment, the content presentation system 104 presents content to one or more users in the physical environment 110. The content presentation system 104 may include hardware and/or software to present content. The content presentation system 104 may include any device and/or application that causes the presentation of content. The content presentation system 104 may display visual content and/or play audio content. The content presentation system 104 may include a television or video monitor, e.g., a liquid crystal display (LCD), light emitting diode (LED) display, plasma display, cathode ray tube (CRT) display, or video projection system that provides visual presentations or entertainment to one or more people. The content presentation system 104 may include an electronic device such as a home entertainment system, television, personal computer system, laptop computer, smart phone, personal digital assistant (PDA), or tablet computing device. The content presentation system 104 may include a video projection system of a movie theater or other venue that provides visual presentations or entertainment simultaneously to groups of people within a same physical environment. The content presentation system 104 may include a cable set-top box that transmits a media stream to a television or video monitor for display. The content presentation system 104 may include a desktop computer which receives a media stream from a web server (e.g., the server 108) and displays the media stream on a video monitor. The content presentation system 104 may include a USB streaming stick which receives the content wirelessly via an access point and displays the content on a video monitor. The content presentation system 104 may include a radio, audio receiver, or audio speaker which plays audio content. The content presentation system 104 may include an audio stream stick which receives an audio stream via an access point and streams the audio (e.g., music) via a speaker system.

The content presented by the content presentation system 104 may include media 120. The media 120 may include video media, audio media, and/or audio/visual media. The media 120 may include pre-programmed and pre-determined media, for example, a regularly scheduled television program or an on-demand program provided by the server 108 via the controller 102. The media 120 may include a locally provided program, for example, a movie or other audio/visual program provided via a DVD or Blu-Ray disc or via a digital video recorder (DVR). The content presented by the content presentation system 104 may also include targeted content 122. The targeted content 122 may include video media, audio media, and/or audio/visual media. The targeted content 122 may include dynamically provided media, provided by the controller 102 and/or the server 108 according to feedback received from the one or more users in the physical environment 110 by the controller 102. The feedback received from the one or more users in the physical environment 110 may be in response to the media 120 and/or the targeted content 122 presented by the content presentation system 104.

In an embodiment, the gesture sensor 106 may include one or more digital cameras or video cameras, for example, including an electronic image sensor or charge coupled device (CCD) image sensor. The gesture sensor 106 may also include one or more audio microphones. The gesture sensor 106 may also include an ultrasonic sensor or other device configured to detect a distance between a person or object in the physical environment 110 and the gesture sensor 106. The gesture sensor 106 may detect an image of the physical environment 110 including the one or more users in the physical environment 110. The gesture sensor 106 may be configured to detect an image within a visible light spectrum and/or an image within an infrared light spectrum. The gesture sensor 106 may detect sounds, for example, verbal expressions, shouting, yelling, screaming, clapping, and/or foot stomping of the one or more users in the physical environment 110. In various embodiments, multiple gesture sensors 106 may be communicatively coupled together, coordinated with one another, and/or coupled with the controller 102 to facilitate detection of images of multiple users within the physical environment 110.

In an embodiment, the controller 102 includes a digital device communicatively coupled with the content presentation system 104, the gesture sensor 106, the data repository 124, and the server 108. The controller 102 receives the content from the server 108 and transmits the content to the content presentation system 104. The controller may also or alternatively receive the content from a local content source, such as a disk drive, DVD player, Blu-Ray player, DVR, memory stick, etc. The controller 102 also receives information from the gesture sensor 106 regarding images and/or audio detected in the physical environment 110. The controller 102 may control the content provided to the content presentation system 104 according to the information received from the gesture sensor 106.

In an embodiment, the controller 102 includes a user recognition engine 114 that recognizes a user in the physical environment 110 according to one or more distinguishing characteristics of the user. The user recognition engine 114 may be configured to perform facial recognition to recognize and identify a user according to facial characteristics of the user. When the user recognition engine 114 first encounters a specific user, the user recognition engine 114 may characterize the user's face and store a characteristic of the user's face in user profiles 130 of the data repository 124 along with a unique identifier for the specific user. The characteristic may include a physical characteristic useful for uniquely identifying the user, as well as information derivable from an image of the user's face, e.g., an age or age range of the user, a likely gender of the user, and/or whether the user wears glasses. Subsequently, each time the user recognition engine 114 encounters a previously characterized user in the physical environment 110, the user recognition engine 114 may use the user profiles 130 to recognize and identify the user as being in the physical environment 110. The controller 102 may also store other information pertaining to the users in the user profiles 130, for example, preferences for each of the users identified, for example, which types of programming each user prefers, which types of products each user prefers, age of the users, gender of the users, and other demographic and preference information for each of the users in the user profiles 130. In various embodiments, multiple user recognition engines 114 may be communicatively coupled together and/or coordinated with one another to facilitate recognition and detection of multiple users within the physical environment 110.

In various embodiments, the user recognition engine 114 may also include a Bluetooth sensor and/or a WiFi sensor that determines an identity of a mobile device in the physical environment 110 corresponding to one or more users in the physical environment. Using data stored with reference to users in the user profiles 130 in combination with information provided by the Bluetooth and/or WiFi sensors, the user recognition engine 114 may recognize one or more users located within the physical environment 110. For example, when a Bluetooth ID associated with a particular user in the user profiles 130 is detected, the user recognition engine 114 may determine that one of the users detected in the physical environment 110 is the user associated with the Bluetooth ID in the user profiles 130. Furthermore, using the Bluetooth ID and/or WiFi ID associated with a user located within the physical environment 110, the controller 102 may communicate directly with the user via the detected mobile device(s) to gather more specific feedback regarding the media 120 and/or targeted content 122 presented to the user by the content presentation system 110. The direct communication via the mobile device may include texting, email, and/or communication via a special purpose app located on the mobile device.

In various embodiments, the user recognition engine 114 may detect a mobile payment system, e.g., via a near field communication (NFC) sensor or a Bluetooth or WiFi sensor. The mobile payment system may include a mobile device, e.g., a cellular telephone, that executes an application for making a payment. The payment may be in any currency, including but not limited to real currency, physical currency, digital currency, cryptocurrency, or electronic currency. A mobile payment system may refer to a credit card or other physical payment component which may be detected by the user recognition engine 114 when the credit card or other physical payment component is used to make a payment. The credit card or other physical payment component may be stored or implemented directly on or separately from the mobile device. The user recognition engine 114 may identify a user based on an association between the user and the detected mobile payment system.

In various embodiments, the user recognition engine 114 may detect an electronic card of a user. The user recognition engine 114 may identify a user based on an association between the user and the detected electronic card. Examples of electronic cards include, but are not limited to, electronic identity documents, keycards, and electronic key smartcards. Electronic cards may refer to or include a mechanical holecard, barcodes, magnetic stripes, Wiegand wire embedded cards, smart card (e.g., embedded with a read/write electronic microchip), and RFID proximity cards.

In an embodiment, the controller 102 includes a gesture analyzer 112 that analyzes the information received from the gesture sensor 106 to recognize a gesture as a predetermined gesture according to a database of trained gestures 126 in the data repository 124 and/or to train to recognize a predetermined gesture to be stored in the database of trained gestures 126 for gesture analyses. The gesture analyzer 112 may analyze gestures performed in front of the content presentation system 104 having large screens, e.g., movie theaters, medium-sized screens, e.g., television sets, and/or small screens, e.g., smartphone screens. In various embodiments, multiple gesture analyzers 112 may be communicatively coupled together and/or coordinated with one another to facilitate recognition and analysis of gestures performed by multiple users within the physical environment 110.

The gesture analyzer 112 may use various information provided by the gesture sensor 106 to analyze gestures. For example, the gesture analyzer 112 may use heat signatures from infrared image data to determine which of one or more potential humans recognized using the visible image data in the physical environment 110 is a live person as opposed to a mannequin or picture. The gesture analyzer 112 may also determine whether a source of a heat signature in the infrared image is a human vs. a pet or other animal. For example, a heat signature of a pet dog in the infrared image may be as large as a human, but may not be recognized as having physical characteristics of a human in the visible light image.

The gesture analyzer 112 may train to recognize a user in the physical environment 110 perform a gesture, e.g., an arm raising gesture, and then store information pertaining to the gesture in the trained gestures 126 of the data repository 124. The information pertaining to the gesture may include motions of a user that define the gesture, a meaning of the gesture, actions to be taken by the controller 102 when the gesture is performed, and other information relevant to the gesture. The training may be performed by analyzing video images of a user moving, identifying points on the user's body that correspond to body parts and joints (e.g., an elbow, a shoulder, a neck, a torso, etc.), and performing machine learning on the motions of the identified points to associate the motions with a specific trained gesture. A meaning may also be assigned to the trained gesture, e.g., a raising of arms may be trained as a trained gesture and associated with a sentiment of excitement. In the example of the arm raising gesture, the speed at which the user's arm raises may be a factor in training for the motion of arm raising. For example, when a user's arms are slowly raised or statically in a raised position, the arm raising gesture may not be recognized. However, when the user raises their arms at a speed similar to the trained speed, e.g., within a predetermined range of speeds, the arm raising gesture may be recognized as the trained arm raising gesture. Speed of motion of different portions of different gestures may also be significant elements of training for recognition of a gesture.

The gesture analyzer 112 may analyze movement of a user in the physical environment 110 in comparison with all the trained gestures 126 in the data repository 124. In an example, the gesture analyzer 112 may recognize the movement of the user as the arm raising gesture stored in the trained gestures 126 of the data repository 124. The gesture analyzer 112 may store information associated with the recognized or detected gesture in gesture information 128 of the data repository 124. The information stored in the gesture information 128 may include a time that the gesture is detected, metadata pertaining to the media 120 being presented to the user by the content presentation system 104 at the time the gesture is detected, a meaning of the detected gesture, and/or a user sentiment or emotion associated with the detected gesture. The trained gestures 126 may include a set of gestures trained for each individual user in the user profiles 130, so that a gesture is recognized by the gesture analyzer 112 by both the movement analyzed from the information provided by the gesture sensor 106 as well as the identity of the user performing the movement according to the user profiles 130. For example, a given gesture with a given meaning may be trained to correspond to different movement characteristics for one user than a different user in the user profiles 130. Likewise, the gesture information 128 may also be keyed to the identity of the user that performed the recognized gesture.

The gesture analyzer 112 may also recognize facial expressions of the user as gestures, e.g., smiling, frowning, and mouth opening or closing. The gesture analyzer 112 may determine whether one or both eyes of the user are open or closed, whether the user's mouth is open or closed, whether the user is looking toward or away from the content presentation system 104, whether the user is seated or standing, whether one or both arms of the user are raised, and a position of the user's face relative to the content presentation system 104 (e.g., yaw, pitch, and roll). The gesture analyzer 112 may determine a linear distance between the detected user and the content presentation system 104 or gesture sensor 106. The detected distance may be used by the gesture analyzer 112 to detect the gesture. For example, when a hand is detected to be raised and move closer to the gesture sensor 106, the gesture analyzer 112 may use the distanced information to determine that the user is reaching for the content presentation system 104, the controller 102, and/or a device associated therewith, e.g., a remote control.

The gesture analyzer 112 may also determine whether a detected user is engaged with the media or not. Particular gestures detected by the gesture analyzer 112, a length of time in which a gesture is continuously detected, a number of gestures detected over time, and/or an amount of elapsed time between detected gestures may be used to determine a level of user engagement with the presented media. Information pertaining to the detected gestures, e.g., the particular detected gestures, length of time a gesture is continuously detected, number of gestures detected over time, and amount of elapsed time between detected gestures, may be stored in the data repository 124.

The gesture analyzer 112 may also determine a corresponding confidence level of the determinations regarding the user. For example, a confidence level of 75% or greater may be a threshold for a candidate gesture to be reported as recognized by the gesture analyzer 112. The confidence level of a candidate gesture may be determined according to various machine learning factors, e.g., correlation values between the machine learned gesture and the information of the gesture sensor 106 analyzed by the gesture analyzer 112.

In an embodiment, the controller 102 includes a targeting engine 118 that uses the gesture information 128 as determined by the gesture analyzer 112 to choose the targeted content 122 to transmit to the content presentation system 104. The targeting engine 118 may choose the targeted content 122 according to the emotional sentiment of one or more users detected in the physical environment 110. The targeted content 122 may include advertisements to be overlayed or injected into the middle of the media 120 or other media to be presented instead of the media 120. For example, the advertisements may be chosen based upon the emotional sentiment of the one or more users at the time the advertisement is to be shown or shortly before. One advertisement may be shown when the emotional sentiment is happy, whereas a different advertisement may be shown when the emotional sentiment is disinterested.

The targeting engine 118 may choose the targeted content 122 according to the user profiles 130 of one or more users detected in the physical environment 110. For example, the user profiles 130 may include product preferences of the users detected in the physical environment 110, e.g., that one user prefers a product A over a product B. The product preferences of the user may be used to determine advertisements to include in the targeted content 122. For example, if it is known from the user profiles 130 that the user prefers product A, an advertisement for product A may be chosen by the targeting engine 118 to be transmitted to the content presentation system 104 as the targeted content 122.

The targeting engine 118 may determine if any user detected in the physical environment 110 is younger than a predetermined appropriate age for certain types of media, and refrain from including media inappropriate for any of the users detected in the physical environment 110 in the targeted content 122. For example, the targeting engine 118 may determine if any user detected in the physical environment 110 is younger than the legal age for drinking alcohol, and only include advertisements for alcohol in the targeted content 122 if there are no users detected in the physical environment 110 that are younger than the legal age.

In an embodiment, the controller 102 includes a media categorization engine 116 to categorize the media 120 and/or targeted content 122 (collectively, media). The media categorization engine 116 may analyze metadata of the media to determine a genre of the media, subject of the media, and/or scene information of the media vs. media play time. The data from categorization of the media may be stored in the media information 132 of the data repository 124 and/or together or in correlation with information pertaining to gestures detected by the gesture analyzer 112 in the data repository 124.

Figure 2:
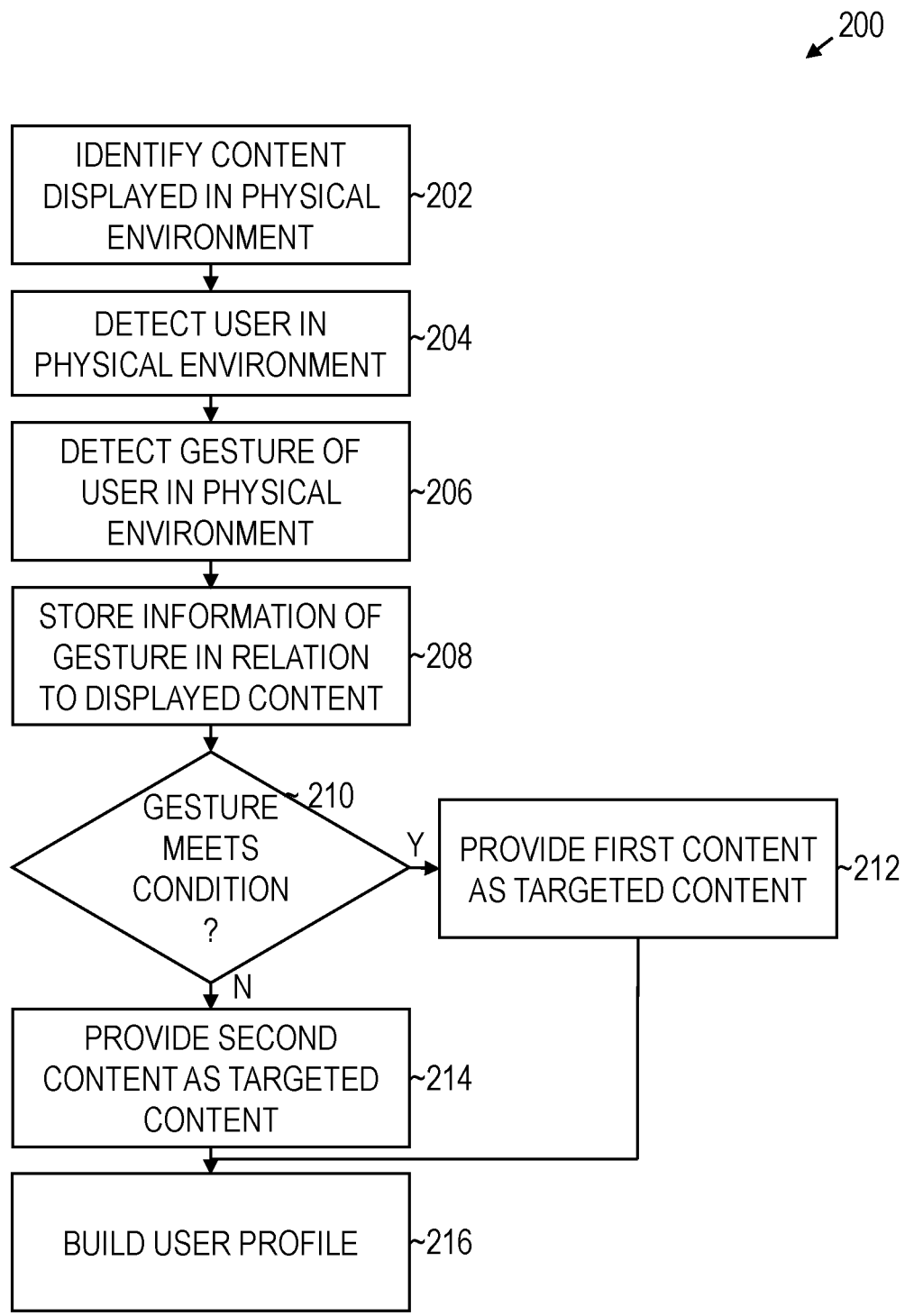
FIG. 2 illustrates an example set of operations for detecting gestures associated with content displayed in a physical environment, in accordance with one or more embodiments.

3. Detecting Gestures Associated with Content Displayed in A Physical Environment FIG. 2 illustrates an example set of operations for detecting gestures associated with content displayed in a physical environment, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. The operations illustrated in FIG. 2 may be performed repeatedly as long as content is displayed by the content presentation system 104. Each detected gesture may be associated with a snapshot of the content or metadata of the content presented at the point in time the gesture is detected.

In an operation 202, the controller 102 may identify content displayed by the content presentation system 104 associated with the physical environment 110. The media characterization engine 116 may analyze metadata associated with the content displayed by the content presentation system 104 to identify the content and determine various characteristics of the content. Examples of the characteristics of the content include name of the content (e.g., television show or movie name, episode name, etc.), genre of the content (e.g., comedy, drama, sci-fi, sports, news, documentary, etc.), year the content was produced or first released, actors or hosts included in the content, source of the content, etc. The identity and characteristics of the content may be stored in the media information 132 of the data repository 124.

In an operation 204, the controller 102 may detect a user in the physical environment 110. The controller 102 may also identify the detected user and store or retrieve information pertaining to the detected user in the user profiles 130 of the data repository 124. The controller 102 may detect and/or identify the user via facial recognition, voice recognition, detection of a mobile payment system associated with the user, and/or detection of an electronic card of the user. The controller 102 may detect and/or identify numerous different users in the physical environment 110. The controller 102 may store and/or retrieve information pertaining to each of the detected users in the user profiles 130 of the data repository 124. The operation 204 may be performed at least in part by the user recognition engine 114.

Detection and/or identification of the numerous different users in the physical environment may also include detecting relationships between the numerous different users. For example, two different identified users may be determined to be related as parent and child, father and son, father and daughter, mother and son, mother and daughter, siblings, twins, a romantically involved couple, a married couple, etc. The determination of the relationship between the two different identified users may be according to information stored in the two different identified users' respective user profiles 130 of the data repository 124.

In an operation 206, the controller 102 may detect a gesture of the one or more users in the physical environment 110. The controller 102 may analyze image information provided by the gesture sensor 106 to detect the gesture according to trained gestures 126 stored in the data repository 124. If there are a plurality of users detected, an aggregate of the users' sentiment may be determined from their respective detected gestures, e.g., facial expressions. For example, if a majority of the detected users are smiling, then an aggregate sentiment may be determined to be happiness. The controller 102 may detect a plurality of gestures over a period of time during which the content, e.g., the media 120, is presented by the content presentation system 104. Each detected gesture may be associated with a time point of the presented content. The operation 206 may be performed at least in part by the gesture analyzer 112.

In an operation 208, the controller 102 may store information associated with the detected gesture in relation to the displayed content in the data repository 124. The controller 102 may store the information in the gesture information 128. The information may include a user emotion, e.g., a sentiment, mapped to the gesture. The information may include a group sentiment when a gesture of more than one user in the physical environment 110 is detected. For example, when a majority of the users in the physical environment 110 are detected as smiling, the sentiment of happiness may be recorded. A time during which the gesture is detected, a time period during which the gesture lasts, and/or spans of time separating detected gestures may also be recorded in the gesture information 128.

The controller 102 may store aggregated information of the gestures detected from the one or more users in the physical environment 110 in association with the displayed content in the media information 132. For example, an aggregate sentiment of the users may be stored in association with specific time points of the presented content in the media information 132. For each time point at which a gesture is detected by the gesture analyzer, an aggregate sentiment as determined by the detected gesture may be stored in the media information 132 pertaining to the respective time point of the presented content. Metadata associated with the presented content, and/or with the respective time points of the presented content, may also be stored in relation to the detected gestures in the media information 132.

In an operation 210, the controller 102 may determine whether the detected gesture or aggregate of detected gestures meets a predetermined condition. For example, the targeting engine 118 may determine whether the gesture detected by the gesture analyzer 112 represents excitement or happiness (e.g., raising of arms in excitement or smiling).

In various embodiments, the controller 102 may also determine whether metadata associated with the one or more detected users meets a predetermined condition, for example, whether a relationship between different detected users meets a predetermined condition of a relationship, or whether an age or gender of one or more detected users meets a predetermined condition. The predetermined conditions in these examples may be that the user is over the age of 21, that the detected users includes a male user, that the detected users includes a female user, that the detected users includes two users that are in a romantic relationship with one another or married to one another, that that the detected users includes a father/son, father/daughter, mother/son, or mother/daughter pair, etc.

In an operation 212, if the controller 102 determines in the operation 210 that the detected gesture or aggregate of detected gestures meets the predetermined condition, the controller 102 may provide a first content (e.g., a first advertisement) to the content presentation system 104 as targeted content 122. For example, if the predetermined condition in the operation 210 is happiness in relation to metadata of the content presented by the content presentation system 104 at the moment in time when the gesture is detected, then the targeting engine 118 may request content from the server 108 that is among one or more items of content to be displayed by the content presentation system 104 when the detected sentiment is happiness in relation to the content displayed at the moment in time when the sentiment of happiness is detected. The targeting engine 118 may then transmit the requested content to the content presentation system 104 as the targeted content 122. The first content may be overlayed onto or inserted in the middle of the content presented at the moment in time when the gesture was detected. For example, the first content may be an advertisement that is played in a commercial break of the content presented at the moment in time when the gesture was detected. The first content may alternatively replace the content presently presented, so that the first content is now presented in place of the content that had been presented at the moment in time when the gesture was detected.

As another example, if the predetermined condition includes a predetermined relationship between two or more detected users, then the targeting engine 118 may request content from the server 108 that is among one or more items of content to be displayed by the content presentation system 104 when the two or more detected users have the predetermined relationship.

In an operation 214, if the controller 102 determines in the operation 210 that the detected gesture or aggregate of detected gestures does not meet the predetermined condition, the controller 102 may provide a second content (e.g., a second advertisement) to the content presentation system 104 as targeted content 122. For example, if the predetermined condition in the operation 210 is happiness in relation to metadata of the content presented by the content presentation system 104 at the moment in time when the gesture was detected, then the targeting engine 118 may request content from the server 108 that is among one or more items of content to be displayed by the content presentation system 104 when the detected sentiment is not happiness in relation to the content displayed at the moment in time when the sentiment of happiness is not detected. The targeting engine 118 may then transmit the requested content to the content presentation system 104 as the targeted content 122. The second content may be overlayed onto or inserted in the middle of the content presented at the moment in time when the gesture was detected. For example, the second content may be an advertisement that is played in a commercial break of the content presented at the moment in time when the gesture was detected. The second content may alternatively replace the content presented at the moment in time when the gesture was detected, so that the second content is now presented in place of the content that had been presented at the moment in time when the gesture was detected.

In an operation 216, a user profile associated with each detected user may be built or updated based upon the user's detected gesture in association with the presented content. The user profile may be stored in the user profiles 130 of the data repository 124. The time the user's gesture is detected may be correlated with metadata of the content presented by the content presentation system 104, e.g., information about the scene at the time the gesture is detected, to store information regarding the user's likes and dislikes as determined by the detected gesture. A sentiment of the specific user in reaction to the displayed content may be stored in the user's profile of the user profiles 130. For example, the user profile may indicate that a user likes a certain genre of movies or TV shows, e.g., comedies, but does not like another certain genre, e.g., horror movies. The user profile may also include deduced likes and dislikes regarding products featured in advertisements the user views and regarding which the system 100 detects gestures. Metadata pertaining to the displayed content, e.g., a genre of the displayed content or metadata regarding the specific time point of the displayed content during which the gesture was performed by the user may be stored in the user's profile. For example, the sentiment expressed by the user when a particular actor or scene of the displayed content is presented by the content presentation system 104 may be stored in the user's profile. The user profile may facilitate advertisements being chosen by the targeting engine 118 as targeted content 122 for presentation by the content presentation system 104 based upon the profiled user's likes and dislikes. The user profile may also include demographic information pertaining to the user, e.g., age, gender, occupation, hobbies, interests, etc. The user profile may also include information pertaining to relationships with other users. For example, a user profile for a user may identify another user having a different user profile and specify a relationship with the other user, e.g., that the user is a father of the other user, a mother of the other user, in a romantic relationship with the other user, married to the other user, etc.

4. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 3:
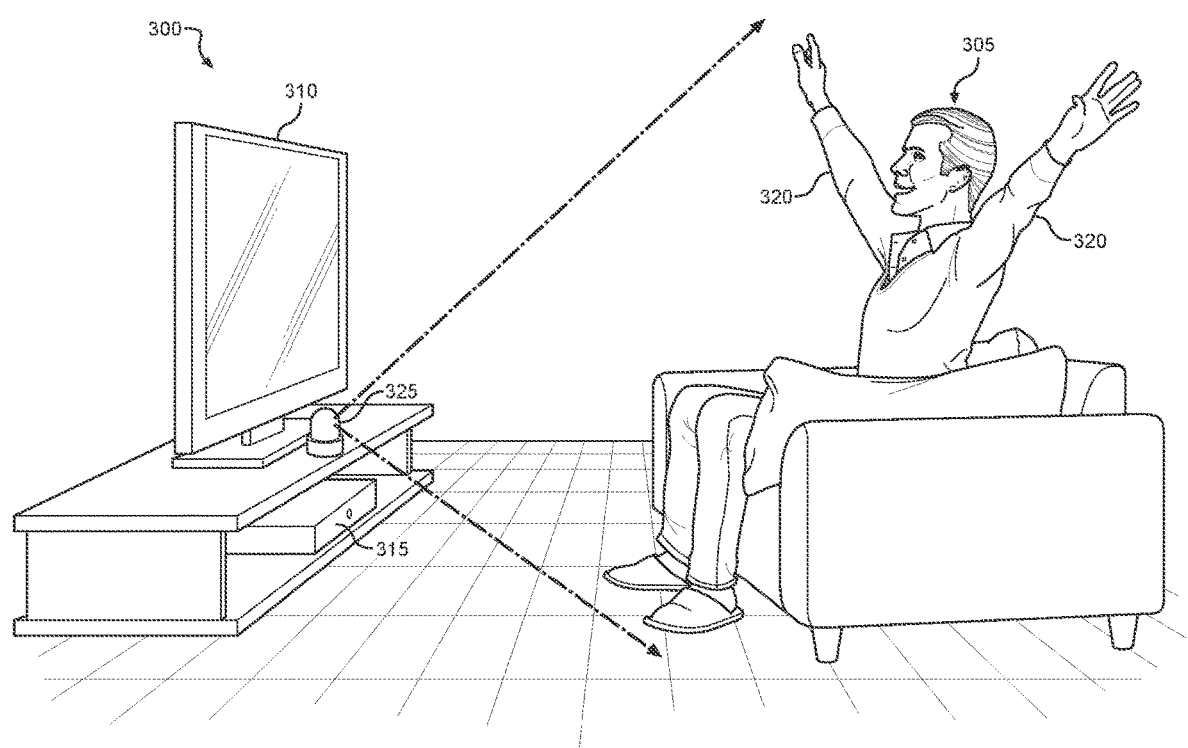
FIG. 3 illustrates an example application of detecting gestures associated with content displayed in a physical environment, in accordance with one or more embodiments.

FIG. 3 illustrates an example application of detecting gestures associated with content displayed in a physical environment 300, in accordance with one or more embodiments. The physical environment 300 may include an embodiment of the physical environment 110 described elsewhere herein. A user 305 may watch and/or listen to content presented to the user 305 via a content presentation system 310. The content may include audio and/or visual content, e.g., a televised football game, a television program such as a sitcom, a movie, etc. The content presentation system 310 may include an embodiment of the content presentation system 104 described elsewhere herein. The content presentation system 310 may be controlled to present the content to the user 305 by a controller 315. The controller 315 may include an embodiment of the controller 102 described elsewhere herein.

While the user 305 is watching and/or listening to the content presented by the content presentation system 310, the user 305 may make gestures in response to the content, and thereby interact with the content presentation system 310. For example, the user 305 may raise their arms 320 in excitement upon seeing their favorite football team make a touchdown in a football game.

A gesture sensor 325 may monitor the gesture of raising their arms 320, and provide information pertaining to the gesture to the controller 315. The gesture sensor 325 may include an embodiment of the gesture sensor 106 described elsewhere herein. The gesture sensor 325 may include a digital video camera and/or a microphone. The gesture sensor 325 may provide a visible light image and/or an infrared image of the user 305 and portions of the physical environment 300 to the controller 315. The gesture sensor 325 may also provide corresponding audio of the user 305 and the physical environment 300 to the controller 315.

The controller 315 may correlate the detected gesture and information imputed from the detected gesture with the media presented by the content presentation system 310 at the time the gesture is detected. The correlation may be performed over time, so that different gestures and their corresponding imputed information is correlated with different time points in the presented media. For example, excitement, happiness, and disinterest may be imputed from detected user gestures, and this imputed information may be correlated with different scenes of presented media, e.g., different scenes in a movie or TV show, different commercial advertisements, different news stories, etc. This correlated information may be stored and/or transmitted to a server (e.g., the server 108) for analysis.

The analysis to be performed on the correlated information may involve corresponding correlated information from other users of other similar content presentation systems 310 presenting the same media, either at a same time or a different time. For example, a percentage of the population that watched and/or enjoyed a particular program presented by the content presentation system 310 may be determined, as well as demographics of the users that watched and/or enjoyed the program. In addition, more granular information pertaining to what percentage of the population watched and/or enjoyed particular scenes or segments of the program may be determined, as well as the demographics of the users that watched and/or enjoyed those particular scenes or segments of the program. User reactions to particular aspects of programs, e.g., particular jokes in a comedy or particular scenes in a movie, may be determined according to a percentage of total users viewing the program and/or demographics of the users viewing the program. These user reactions may be used to determine the content of future programs such as television programs and movies.

Furthermore, demographic information of users 305 that enjoyed a particular program may be used for targeting advertisements to be presented to particular users that match ideal demographics and/or preferences for the advertisements. For example, advertisements for football-related products may be targeted to users that have been detected as being happy or excited about football games and not toward users that have been disinterested in football games. As another example, advertisements for a particular type of product (e.g., sodas) may be targeted to users that have been detected as being happy or excited about previous commercials for that particular type of product, and not those that have been detected as not being interested in advertisements for that particular type of product. Likewise, advertisements for a particular brand of product (e.g., sodas) may be targeted to users that have been detected as being happy or excited about previous commercials for a competing brand of the product (e.g., sodas).

The analysis may be performed in real-time so that targeted content 122 (e.g., targeted commercial advertisements) may be directed to the user according to the real-time user reactions to the presented content (e.g., media 120). Furthermore, the analysis may facilitate pricing of commercial advertisements to be determined according to the sentiment of many users watching the presented content. For example, as user engagement increases, e.g., toward the end of a big football game, pricing for commercial advertisements may increase. When the pricing increases, predetermined price ranges for various commercial advertisements may be analyzed to determine which commercial advertisements are to be presented as targeted content 122. Likewise, as detected user engagement changes, predetermined user engagement ranges for various commercial advertisements may be analyzed to determine which commercial advertisements are to be presented as targeted content 122. Various other demographic and user information as discussed herein may also be used to determine the targeted content 122 to present to the user 305 via the content presentation system 310. The targeted content 122 may be predetermined to be presented to a user 305 that meets certain demographic, engagement, and/or sentiment characteristics. For example, certain advertisements may be targeted to a certain user 305 when the user 305 is detecting as being happy, while other advertisements may be targeted to the certain user 305 when the user 305 is detected as being sad, etc.

The analysis of aggregated data from many users 305 may facilitate providing providers of the media 120 and/or targeted content 122 with information pertaining to the demographics of users 305 that watch and/or enjoy their programs. This information may be more specific than information pertaining to the number of households who watch their programs. For example, the identity of each user 305 that watches and/or enjoys a particular media 120 or targeted content 122 may be determined according to facial recognition and/or other means, and demographic information specific to the detected user 305 may be stored and/or transmitted to a server pertaining to the media 120 or targeted content 122. For example, within a single household, one user 305 (e.g., a parent) may watch and/or enjoy one type of program (e.g., a mystery) while another user 305 (e.g., a child) may watch and/or enjoy a different type of program (e.g., an action/adventure). The demographic information provided in response to the parent watching the mystery program may be different than the demographic information provided in response to the child watching the action/adventure program. Collectively, information gathered from many different users 305 may more accurately measure the demographics of viewers of various programs than merely a percentage of households that view the programs. Likewise, different targeted content 122 may be presented to different users 305 within a single household according to the different stored demographics and/or preferences of the different users 305.

Figure 4:
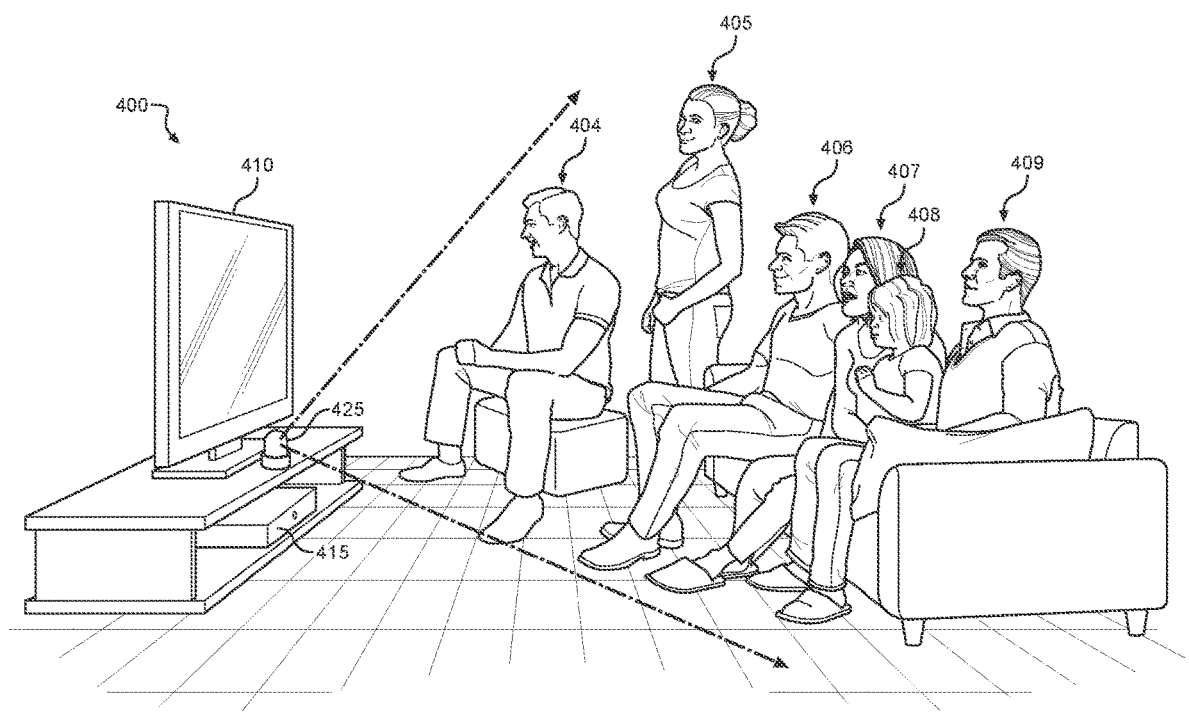
FIG. 4 illustrates an example application of detecting gestures associated with content displayed in a physical environment, in accordance with one or more embodiments.

FIG. 4 illustrates an example application of detecting gestures associated with content displayed in a physical environment 400, in accordance with one or more embodiments. The physical environment 400 may include an embodiment of the physical environment 110 described elsewhere herein. A group of users 404-409 may be watching and/or listening to content presented to the group of users 404-409 via a content presentation system 410. While six users 404-409 are illustrated in FIG. 4, in various embodiments, there may be more or fewer users in the physical environment 400 watching the content presentation system 410. The content may include audio and/or visual content, e.g., a televised football game, a television program such as a sitcom, a movie, etc. The content presentation system 410 may include an embodiment of the content presentation system 104 described elsewhere herein. The content presentation system 410 may be controlled to present the content to the group of users 404-409 by a controller 415. The controller 415 may include an embodiment of the controller 102 described elsewhere herein.

While the group of users 404-409 watches and/or listens to the content presented by the content presentation system 410, each of the users 404-409 may individually make gestures in response to the content, and thereby interact with the content presentation system 410. For example, each of the users 404-409 may smile, frown, or have a straight face in response to a scene of a movie. Some of the users 404-409 may smile while others do not at different moments in time while watching the content presented by the content presentation system 410.

A gesture sensor 425 may monitor the gestures, e.g., facial expressions, of each of the users 404-409 asynchronously and provide information pertaining to whether each of the users 404-409 is smiling to the controller 415. The gesture sensor 425 may include an embodiment of the gesture sensor 106 described elsewhere herein. The gesture sensor 425 may include a digital video camera and/or a microphone. The gesture sensor 425 may provide a visible light image and/or an infrared image of the group of users 404-409 and portions of the physical environment 400 to the controller 415. The gesture sensor 425 may also provide corresponding audio of the group of users 404-409 and the physical environment 400 to the controller 415.

The controller 415 may analyze the gesture, e.g., facial expression, of each of the users 404-409 to determine whether each of the users 404-409 is smiling, and impute an emotion or sentiment to each of the users 404-409 according to their detected facial expression. The controller 415 may then compute a group sentiment based upon the individual sentiments detected for each of the users 404-409 according to a threshold percentage or number of the users 404-409 that are detected as expressing the group sentiment. For example, if a majority of the users 404-409 is detected as having a sentiment of happiness, e.g., via being detected as smiling, then the group sentiment may be determined to be happiness at that moment in time.

Information pertaining to the individual users 404-409 may be obtained and used in a manner similar to that of the user 305 as described with reference to FIG. 3. In addition, the information pertaining to the group sentiment of the users 404-409 may also be used in a manner similar to the sentiment of the user 305 as described with reference to FIG. 3. Furthermore, information pertaining to the group of the users 404-409 being a group of users as opposed to a single user may be generated and used. For example, a count of the users 404-409 present in the physical environment 400 may be taken over a period of time as the media 120 and/or targeted content 122 is presented to the group of users 404-409. The count of the user 404-409 over time may be correlated with metadata of the media 120 and/or targeted content 122 over time to at least aid in determining a sentiment and/or engagement with the media of the users 404-409 in relation to the media 120 and/or targeted content 122.

Information pertaining to relationships between any of the individual users 404-409 may be obtained from the user profiles of the detected users 404-409 and used to determine the targeted content 122 to be presented to the group of users 404-409 by the content presentation system 410. In this way, detected relationships between any of the users 404-409, e.g., detected family relationships, may dictate the targeted content 122 that is selected and presented to the users 404-409 via the content presentation system 410. For example, if the group of users 404-409 is detected to include a father-son pair, commercial advertisements intended for mother-daughter pairs may not be included in the targeted content 122, but commercial advertisements intended for father-son pairs may be selected to be included in the targeted content 122. Likewise, if a couple that is romantically involved with one another is detected among the group of users 404-409, commercial advertisements for vacations for a couple may be included in the targeted content 122, but not included otherwise. Additionally, if a parent and a child of that parent are both watching a program together, then commercial advertisements for an amusement park for families with children or toys for children may be included in the targeted content 122 and not included otherwise.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
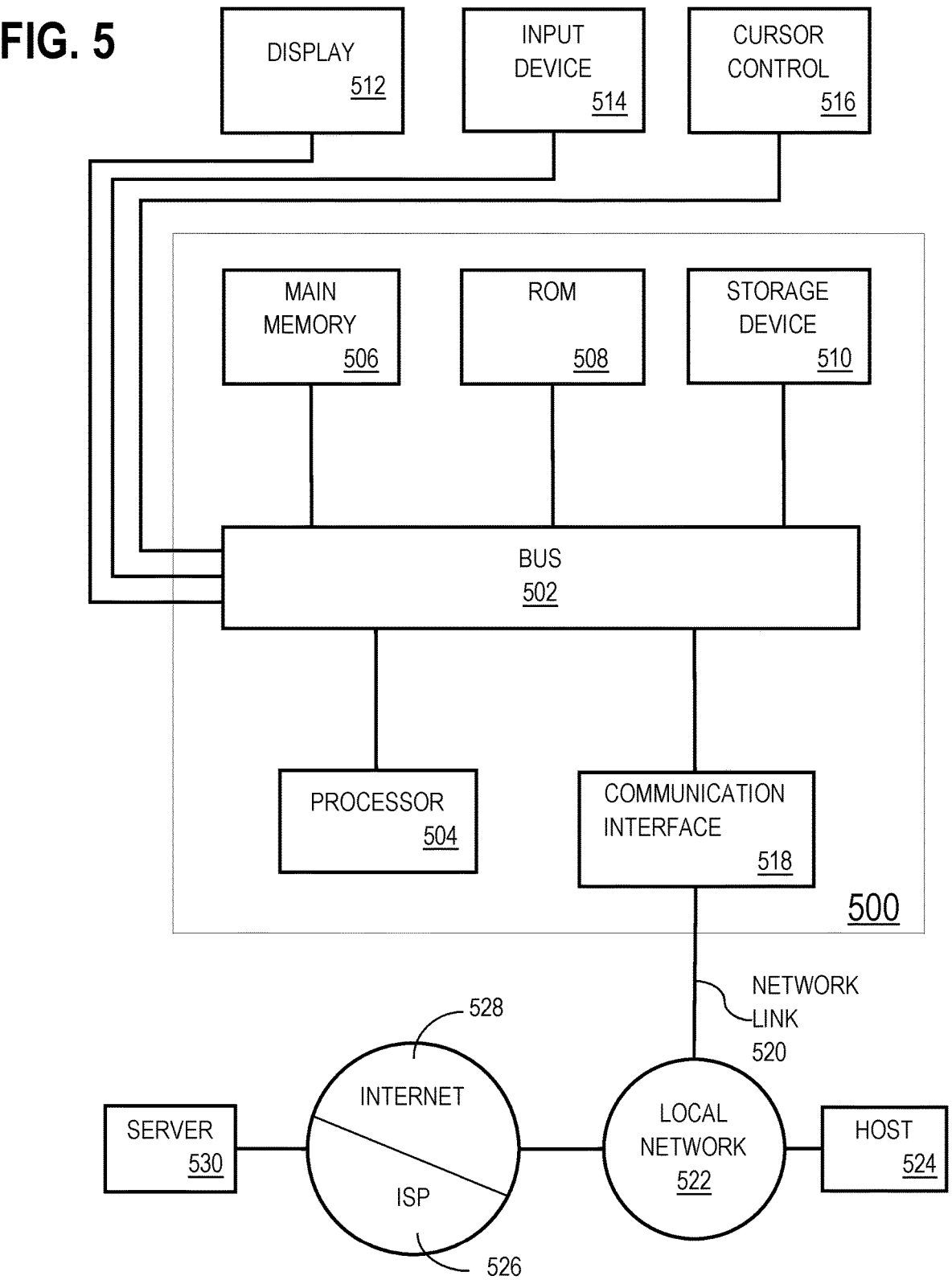
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   training a machine learning model to recognize a plurality of trained gesture at least by:
      obtaining a first set of digital video images showing a first motion of body parts of a person;
      storing the first motion of the body parts of the person in association with a hand gesture of the plurality of trained gestures;
      training the machine learning model based at least on the first motion of the body parts of the person and the associated hand gesture;
   identifying content displayed by a content presentation system associated with a physical environment;
   obtaining a second set of digital video images showing a user located within the physical environment;
   performing computer processing of the second set of digital video images to determine a second motion of the body parts of the user;
   inputting at least the second motion of the body parts of the user into the machine learning model to recognize the hand gesture from the plurality of trained gestures;
   determining a length of time during which the hand gesture is continuously detected;
   based at least on the length of time during which the hand gesture is continuously detected, determining gesture information comprising a level of user engagement with the content;
   based at least on the gesture information comprising the level of user engagement with the content, selecting a targeted content from a plurality of targeted contents; and
   transmitting the targeted content to the content presentation system.

2. The medium of claim 1, wherein the operations further comprise:
   determining an amount of elapsed time between the hand gesture and another gesture in the digital images;
   wherein the gesture information is determined further based on the amount of elapsed time.

3. The medium of claim 1, wherein the targeted content comprises at least one of an audio program and a video program.

4. The medium of claim 1, wherein the hand gesture comprises raising of an arm.

5. The medium of claim 1, wherein the hand gesture comprises motion of a hand in view of a facial expression.

6. The medium of claim 1, wherein the gesture information comprises a user emotion mapped to the hand gesture.

7. The medium of claim 1, wherein the operations further comprise:
   performing facial recognition to identify the user;
   storing the gesture information in relation to the identified user.

8. The medium of claim 1, wherein the operations further comprise:
   performing facial recognition to identify the user;
   computing a sentiment associated with the user based on the hand gesture; and
   storing the sentiment associated with the user in relation to the content.

9. The medium of claim 1, further comprising:
   detecting a plurality of gestures of the user at a plurality of points in time; and
   storing a time-indexed stream of information associated with the plurality of gestures in relation to points in time of the content.

10. The medium of claim 1, wherein the targeted content comprises an advertisement.

11. The medium of claim 1, wherein the operations further comprise:
   determining a sentiment associated with the hand gesture; and
   storing the sentiment in relation to a user profile of the user.

12. The medium of claim 1, wherein the operations further comprise:
   determining that a particular product appears in a scene, of the content, displayed at a particular time that the second set of digital video images are captured;
   storing the gesture information in relation to the particular product.

13. The medium of claim 1, wherein the gesture information further comprises a sentiment associated with the hand gesture and the targeted content is selected based at least on the level of user engagement and the sentiment.

14. The medium of claim 13, wherein the operations further comprise:
determining a characteristic associated with a scene, of the content, displayed at a particular time that the second set of digital video images are captured;
storing the sentiment in association with the characteristic of the scene.

15. The medium of claim 1, wherein the operations further comprise:
determining a characteristic associated with a scene, of the content, displayed at a particular time that the second set of digital video images are captured;
deducing the user's likes or dislikes regarding the characteristic based on the hand gesture.

16. The medium of claim 1, wherein the operations further comprise
logging an amount of elapsed time between the hand gesture and a second gesture;
selecting the targeted content further based on the amount of elapsed time.

17. The medium of claim 1, wherein the operations further comprise:
based at least on the gesture information, determining pricing for presenting any targeted content in association with the content;
identifying a plurality of content items, wherein the plurality of content items comprise the targeted content;
identifying predetermined price ranges respectively associated with the plurality of content items;
wherein selecting the targeted content is responsive at least to determining that the pricing determined for presenting any targeted content in association with the content is within a predetermined price range associated with the targeted content.

18. The medium of claim 1, wherein the operations further comprise:
detecting, by one or more sensors, ultrasonic signals associated with the physical environment;
determining a distance between at least one body part of the user and the one or more sensors based on the ultrasonic signals;
determining that the user performed the hand gesture based at least on the distance between the at least one body part and the one or more sensors.

19. The medium of claim 1, wherein the operations further comprise:
identifying a plurality of content items, wherein the plurality of content items comprise the targeted content;
identifying predetermined user engagement ranges respectively associated with the plurality of content items;
wherein selecting the targeted content is responsive at least to determining that the level of user engagement is within a predetermined user engagement range associated with the targeted content.

20. The medium of claim 1, wherein the operations further comprise:
determining[e] that a second user is within the physical environment;
determining a relationship between the user and the second user;
wherein the targeted content is selected further based on the relationship between the user and the second user.

21. The medium of claim 1, wherein performing the computer processing of the second set of digital images to determine the second motion of the body parts of the user comprises:
determining a plurality of points, in the digital images, corresponding to the body parts;
determining motions, in the digital images, of the plurality of points;
identifying the motions of the plurality of points as the second motion of the body parts of the user.

22. The medium of claim 21, wherein recognizing the hand gesture in the digital images is based on the motion of the plurality of points corresponding to the body parts.

23. The medium of claim 21, wherein recognizing the hand gesture in the digital images comprises:
recognizing the motion of the plurality of points corresponding to the body parts as the first motion of the body parts that is associated with the hand gesture of the plurality of trained gestures.

24. The medium of claim 23, wherein each of the plurality of trained gestures is associated with a respective motion of the body parts with respect to the user, and each of the plurality of trained gestures is associated with another respective motion of the body parts with respect to a second user.

25. The medium of claim 1, wherein the operations further comprise:
detecting, by one or more sensors, signals within an infrared light spectrum;
determining a heat signature based on the signals;
wherein recognizing the hand gesture in the digital images is further based on the heat signature.

26. The medium of claim 1, wherein the operations further comprise:
displaying the targeted content on the content presentation system.

* * * * *